(12) United States Patent
Hagseth et al.

(10) Patent No.: US 7,870,720 B2
(45) Date of Patent: Jan. 18, 2011

(54) INLET ELECTROMAGNETIC FLOW CONTROL

(75) Inventors: Paul E. Hagseth, Ft. Worth, TX (US); Paul D. McClure, Ft. Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/564,384

(22) Filed: Nov. 29, 2006

(65) Prior Publication Data
US 2008/0277004 A1 Nov. 13, 2008

(51) Int. Cl.
*B63H 11/00* (2006.01)
*B64D 33/02* (2006.01)

(52) U.S. Cl. ...................... 60/204; 244/53 B (58) Field of Classification Search .......... 417/48, 417/50; 137/803, 15.1, 15.2; 315/111.51, 315/111.61, 111.01, 500, 501; 313/359.1, 313/361.1, 362.1; 60/202, 204, 269, 203.1; 415/914; 244/53 R, 53 B, 54
See application file for complete search history.

(56) References Cited

U.S. PATENT DOCUMENTS

| | | | |
|---|---|---|---|
| 2,763,125 A * | 9/1956 | Kadosch et al. ............... 60/230 |
| 3,095,163 A * | 6/1963 | Hill ........................... 244/12.1 |
| 3,171,060 A | 2/1965 | Wood et al. | |
| 3,360,220 A | 12/1967 | Meyer | |
| 3,374,629 A * | 3/1968 | Boucher ...................... 60/202 |
| 3,392,941 A | 7/1968 | Cason, III | |
| 3,535,586 A * | 10/1970 | Sabol ..................... 315/111.61 |
| 3,613,370 A * | 10/1971 | Paine ......................... 60/202 |
| 3,678,306 A * | 7/1972 | Garnier et al. ................. 310/11 |
| 4,638,216 A * | 1/1987 | Delaunay et al. ........ 315/111.81 |
| 5,300,861 A * | 4/1994 | Helgesen et al. ........ 315/111.41 |
| 5,320,309 A | 6/1994 | Nosenchuck | |

(Continued)

FOREIGN PATENT DOCUMENTS

EP 1 672 966 A 6/2006

(Continued)

OTHER PUBLICATIONS

"Topical Review; Plasmas in high speed aerodynamics; TopicalReview"; Journal of Physics D. Applied Phsics, Institute of Physics Pblishing, Bristol, GB; vol. 38, No. 4; Feb. 21, 2005; pp. 33-R57; p. R49-R52.

(Continued)

*Primary Examiner*—Charles G Freay
*Assistant Examiner*—Alexander B Comley
(74) *Attorney, Agent, or Firm*—Bracewell & Giuliani LLP (57) ABSTRACT

A method to manipulate boundary layer conditions within a ducted fluid flow is provided. This method may be used to attach fluid flow to ducted surfaces bounding the fluid flow. This involves flowing a fluid over the surface wherein the fluid contains positively charged ions and electrons. An electric field accelerates ions and electrons in directions parallel to the electric field. The accelerated positively charged ions accelerate low energy air within lower regions of a boundary layer over the ducted surfaces bounding the ducted fluid flow. A magnetic field at the surface redirects ions and electrons based on their velocity and charge. The magnetic field imparts little force on the relatively heavy and slow moving positive ions but has a significant impact on the relatively fast moving, light weight electrons.

13 Claims, 11 Drawing Sheets

U.S. PATENT DOCUMENTS

| | | | |
|---|---|---|---|
| 5,791,275 A | 8/1998 | Bandyopadhyay | |
| 5,847,493 A * | 12/1998 | Yashnov et al. | 313/231.31 |
| 5,890,681 A | 4/1999 | Meng | |
| 6,096,160 A * | 8/2000 | Kadomura | 156/345.49 |
| 6,195,980 B1 * | 3/2001 | Walther | 60/202 |
| 6,215,124 B1 * | 4/2001 | King | 250/423 R |
| 6,220,549 B1 | 4/2001 | Tsunoda et al. | |
| 6,332,593 B1 * | 12/2001 | Kamiadakis et al. | 244/204 |
| 6,345,791 B1 | 2/2002 | McClure | |
| 6,523,338 B1 * | 2/2003 | Kornfeld et al. | 60/202 |
| 6,644,014 B2 * | 11/2003 | Provitola | 60/202 |
| 6,696,792 B1 * | 2/2004 | Foster | 315/111.21 |
| 6,777,862 B2 * | 8/2004 | Fisch et al. | 313/359.1 |
| 6,798,141 B2 * | 9/2004 | Kornfeld et al. | 315/111.21 |
| 6,803,705 B2 * | 10/2004 | Kornfeld et al. | 313/231.31 |
| 6,805,325 B1 | 10/2004 | Malmuth et al. | |
| 6,960,888 B1 * | 11/2005 | Foster | 315/111.81 |
| 7,084,572 B2 * | 8/2006 | Kornfeld et al. | 315/111.21 |
| 7,236,344 B2 * | 6/2007 | McCullough | 361/231 |
| 7,247,992 B2 * | 7/2007 | Kornfeld et al. | 315/111.61 |
| 7,247,993 B2 * | 7/2007 | Kornfeld et al. | 315/111.61 |
| 7,413,149 B2 | 8/2008 | Minick et al. | |
| 2004/0223852 A1 * | 11/2004 | Hartley | 417/48 |
| 2005/0034464 A1 | 2/2005 | Gonzalez | |
| 2005/0212442 A1 | 9/2005 | Kornfeld | |
| 2006/0138966 A1 | 6/2006 | Kornfeld et al. | |
| 2006/0150611 A1 * | 7/2006 | Allen | 60/203.1 |
| 2008/0023589 A1 | 1/2008 | Miles et al. | |
| 2008/0116808 A1 | 5/2008 | McClure | |

FOREIGN PATENT DOCUMENTS

| | | |
|---|---|---|
| EP | 1 681 465 A | 7/2006 |
| GB | 738 511 A | 10/1955 |
| RU | 2 076 829 C1 | 4/1997 |
| WO | WO2007/123612 A2 | 11/2007 |

OTHER PUBLICATIONS

Office Action for Co-Pending U.S. Appl. No. 11/562,777, dated Mar. 20, 2009, 6 pages.

* cited by examiner

FIG. 10A
mems sheer sensor

FIG. 10B
mems pressure sensor

FIG. 10C
mems velocity sensor

FIG. 11

INLET ELECTROMAGNETIC FLOW CONTROL

TECHNICAL FIELD OF THE INVENTION

The present invention relates generally to manipulation of fluid flow and more particularly, a system and method for manipulating a ducted ionized fluid flow.

BACKGROUND OF THE INVENTION

Most modern aircraft are powered by gas turbine engines, also known as jet engines. There are several types of jet engines, but all jet engines have certain parts in common. For example, all jet engines have an inlet with which to bring in free stream air into the engine. The inlet sits upstream of the compressor and, while the inlet does no work on the flow, there are important design features associated with the inlet. The total pressure through the inlet changes because of several flow effects. The inlet pressure performance is often characterized by the inlet pressure recovery, which measures the amount of free stream flow conditions that are recovered. This pressure recovery depends on a wide variety of factors, including inlet shape, aircraft speed, air flow demand of the engine, and aircraft maneuvers.

Flow field disturbances generated by fluid flow over aerodynamic surfaces within the inlet can buffet and fatigue downstream components exposed to these disturbances and reduce overall engine performance. Disturbances can also be ingested within engine air intakes leading to poor performance and/or stalling of the aircraft engines. This problem is exacerbated when the engine inlets have serpentine flow paths or exotic aperture shapes. These inlets and outlets may cause excessive propulsion performance losses. These losses emanate from strong secondary flow gradients in the near wall boundary of the airflow, which produce coherent large-scale vortices. Stalling the aircraft engine creates a potentially hazardous condition.

In the past, such problems have been solved by redesign of the inlet duct or redesign of the fan or compressor blades by adding dampening or increasing blade strength to change the natural frequency. Any of these changes may involve increased cost and weight associated with the aircraft.

Another solution employs passive vortex generator vanes to mitigate the effects of flow field vortices. However, these vanes result in increased weight and reduced performance over the engine's entire operating envelope. Vortex generators are small wing like sections mounted on an aerodynamic surface exposed to the fluid flow and inclined at an angle to the fluid flow to shed the vortices. The principle of boundary layer control by vortex generation relies on induced mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent replace low momentum boundary layer flow. This is a continuous process that provides a source to counter the natural growth of the boundary layer creating adverse pressure gradients and low energy secondary flow accumulation.

Yet another solution may employ variable geometries to alleviate these difficulties. Variable geometries allow the circumference of the inlet to vary thus changing the cross-sectional flow area. These solutions have many inherent disadvantages which penalize aircraft performance. For instance, variable geometry configurations can make up a significant portion of the weight of an engine. Such inlets are typically made of large, heavy metal flaps which mechanically alter their geometry by diverting fluid flow with physical blockage, and thus have to endure the high pressures associated with fluid flow. In these inlets, the actuators used to adjust the flaps to appropriate positions in the fluid flow tend to be heavy, expensive and complex because of the forces presented by the fluid flow which the flaps must overcome. Further, the flaps typically constrict the flow by closing and overlapping each other, which allows air to escape between the flaps. Variable geometry inlets are also difficult to implement on exotic nozzle aperture shapes.

Another method injects secondary flow(s) of high pressure air into the primary flow. Although the injection of a secondary flow will support a fixed geometry configuration, this method also introduces inefficiencies to the engine's operation. Injection of air across the flow tends to use a large amount of high pressure air. Thus, injection can introduce inefficiency because the total momentum of the fluid flow is decreased by the decreased flow from the compressor section into the combustion section if compressed air is bled from the compressor section for injection. This inefficiency can result in a reduced range of operations for a given fuel supply and a fuel flow.

New technology is therefore needed which will allow greater freedom to improve fluid flow within an engine inlet. Further limitations and disadvantages of conventional control surfaces and related functionality will become apparent to one of ordinary skill in the art through comparison with the present invention described herein.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

Embodiments disclosed herein may be better understood, and their numerous objects, features, and advantages made apparent to those skilled in the art by referencing the accompanying drawings. The use of the same reference symbols in different drawings indicates similar or identical items.

DETAILED DESCRIPTION OF THE INVENTION

Preferred embodiments of the present invention are illustrated in the figures like numerals being used to refer to like and corresponding parts of the various drawings.

The present invention provides a system and method for manipulating fluid flow within an inlet that substantially eliminates or reduces disadvantages and problems associated with previously developed systems and methods. More specifically, the present invention provides a system and method to improve boundary layer profiles within a flow inlet and reduce buffeting or fatigue to engine components through the use of electromagnetic flow control. Embodiments place electromagnetic flow controllers (plasma accelerators) that accelerate low energy air within the lower regions of the boundary layer on ducted surfaces bounding the fluid flow. These electromagnetic flow controllers manipulate the flow behavior at this boundary of the fluid flow, to reduce flow separation within the primary fluid flow and improve inlet performance.

These electromagnetic flow controllers are operable to modify the turbulent structure of eddies in most complex flows with the intent to improve aerodynamic performance of aircraft propulsion systems. Such capability can increase range and maneuverability, and reduce acoustic loads, signature, weight, and cost. A relatively small amount of ionized fluid is accelerated to provide high-momentum secondary fluid operable to be used to enhance the naturally occurring instabilities of the main flow. For example, electromagnetic flow controllers may be used to favorably influence the flow within engine inlets or other ducted fluid flows (i.e. heating/cooling components).

In physics and chemistry, plasma (also called an ionized gas) is an energetic state of matter in which some or all of the electrons in the outer atomic orbital rings have become separated from the atom. Excitation of plasma requires partial ionization of neutral atoms and/or molecules of a medium. There are several ways to cause ionization including collisions of energetic particles, strong electric fields, and ionizing radiation. The energy for ionization may come from the heat of chemical or nuclear reactions of the medium, as in flames, for instance. Alternatively, already released charged particles may be accelerated by electric fields, generated electromagnetically or by radiation fields.

There are two broad categories of plasma, hot plasmas and cold plasmas. In hot plasma, full ionization takes place, and the ions and the electrons are in thermal equilibrium. A cold plasma (also known as a weakly ionized plasma) is one where only a small fraction of the atoms in a gas are ionized, and the electrons reach a very high temperature, whereas the ions remain at the ambient temperature. These plasmas can be created by using a high electric field, or through electron bombardment from an electron gun, and other means.

Plasma (ionized fluid) flow may be accelerated by electromagnetic flow controllers (plasma accelerators) with an electric field in accordance with embodiments of the present invention. These electromagnetic flow controllers accelerate low energy air within the lower regions of the boundary layer. Manipulating the flow behavior at this boundary of the fluid flow may reduce flow separation within the primary fluid flow and improve inlet performance.

Figure 1:
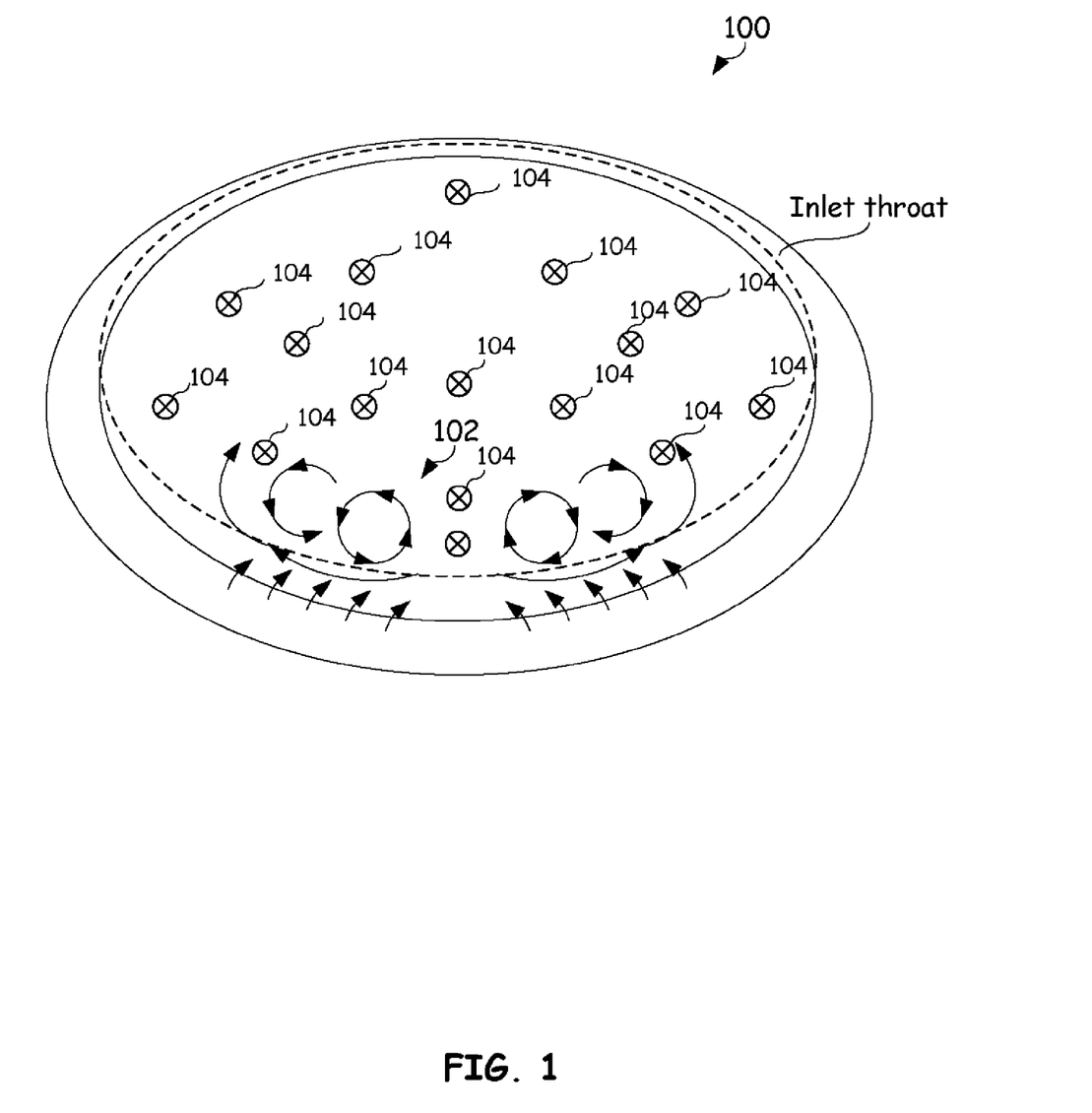
FIG. 1 depicts flow distortions within a flow inlet that are addressed by embodiments of the present invention.

FIG. 1 provides a cross sectional view of a flow field within a duct or flow inlet 100. Within inlet 100, vortex formation is indicated within the inlet by lines 102. This vortex formation may begin as primary fluid flow enters the flow inlet and may continue to grow and cause the flow field distortion as the primary fluid flow 104 reaches the compressor face of an engine coupled to the flow inlet.

Figure 2:
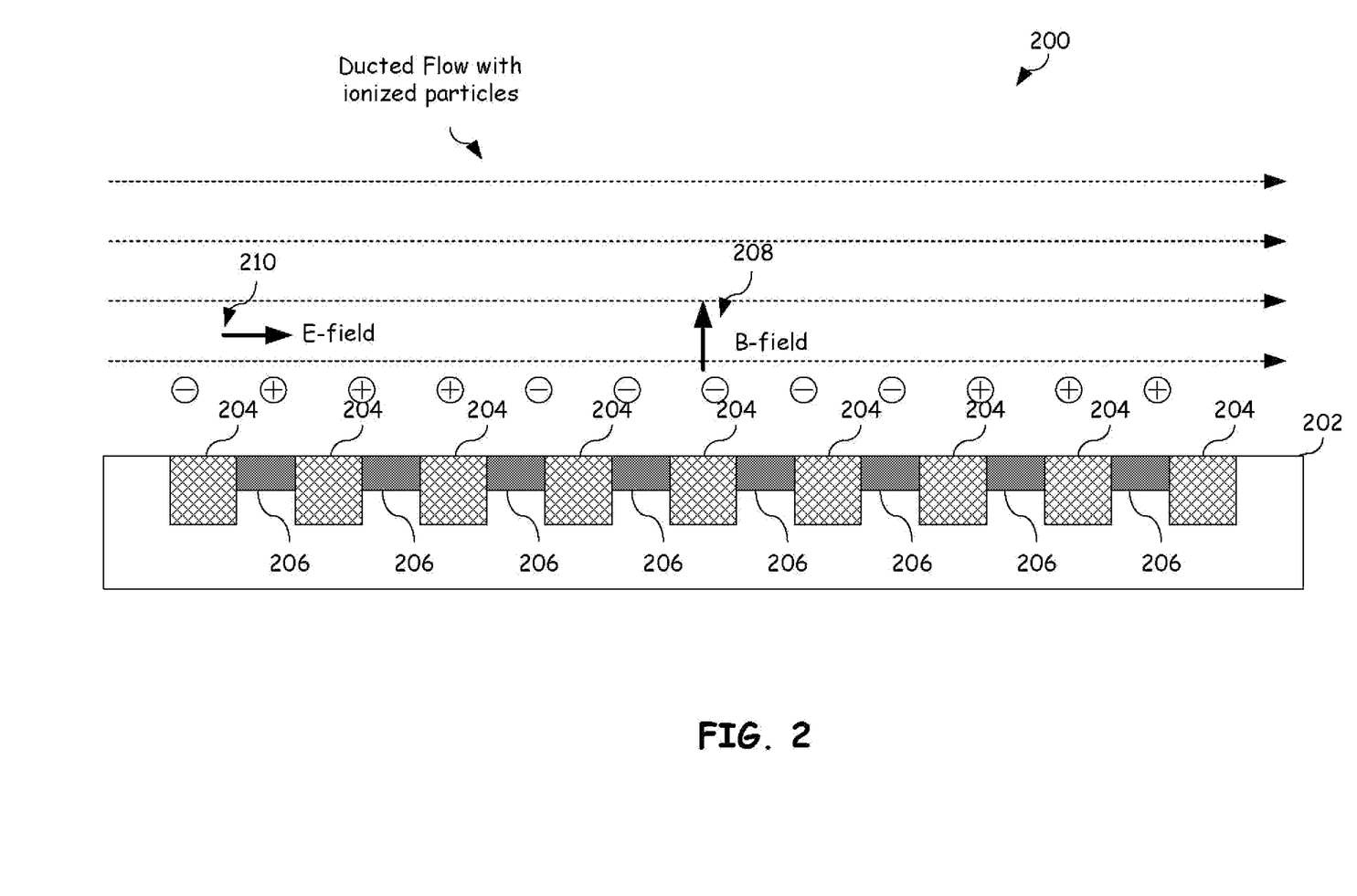
FIG. 2 depicts an electromagnetic flow accelerator operable to be used to manipulate fluid flow over a surface in accordance with embodiments of the present invention.

FIG. 2 depicts an electromagnetic flow accelerator 200 operable to be used to manipulate fluid flow within an inlet or ducted flow. Plasma accelerator 200 includes a ducted surface 202, electrodes 204, magnetic material or magnets 206. As shown ducted fluid flow 201 passes over ducted surface 202. A series of electrodes 204 may be embedded within or at ducted surface 202. These electrodes may generate an electric field 210 operable to accelerate ions within the ducted flow. These ions may be accelerated in a direction parallel to the electric field as shown here in FIG. 2. Other embodiments may accelerate the ionized particles in other directions within the plane of the fluid flow as will be discussed later. Magnets 206 may be embedded within or at ducted surface 202. These magnets generate a magnetic field 208 normal to ducted surface 202. The force due to an electric field $\vec{E}$ is defined from the Coulomb's law: $\vec{F} = q\vec{E}$. The electric field $\vec{E}$ accelerates the ionized fluid (indicated by "+" symbols) within fluid flow toward an aft portion of ducted surface 202, while the electrons (indicated by "−" symbols) are accelerated in the opposite direction.

The force due to a magnetic field $\vec{B}$ is defined from the Lorentz Force Law, and specifically from the magnetic force on a moving charge: $\vec{F} = q\vec{v} \times \vec{B}$. The Lorentz Force law is accurately modeled by $\vec{F} = q\vec{E} + q\vec{v} \times \vec{B}$ where x indicates a vector cross product an $\vec{F}$, $\vec{E}$, $\vec{v}$, and $\vec{B}$ are vectors for the Force, Electric Field, Velocity, and Magnetic Field respectively. This relationship explains why the force on the electron is large when compared to the force experienced by the positively charged ions. The electric field force on the ion and the electron are opposite but equal (opposite due to the opposite charge). However, the velocity of the electrons is very large due to the electron's small mass. However, the velocity of the ions is small due to the same Electric field force acting on their relatively large mass. The force from the magnetic field is large on the electron because the electron has a large velocity in a direction normal to the B-field. The ion velocity is small in comparison to that of the electron. Thus the magnetic field $\vec{B}$ force acting on the ion is small.

Figure 3:
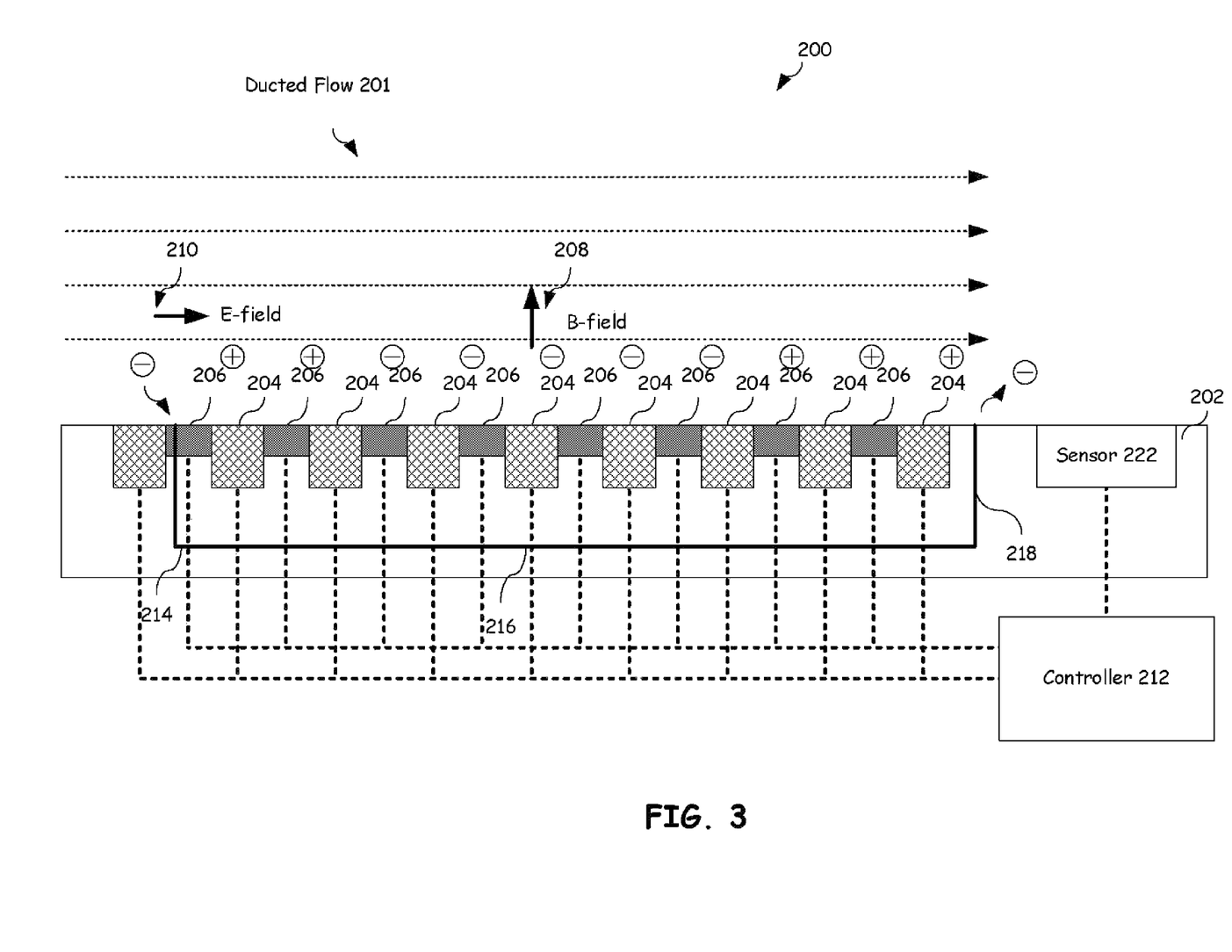
FIG. 3 depicts a second electromagnetic flow accelerator operable to be used to manipulate fluid flow over a surface in accordance with embodiments of the present invention.

The magnetic field $\vec{B}$ in FIGS. 2 and 3 is applied substantially normal to the direction of the ducted fluid flow and creates a large force on the electrons. The force of magnetic field $\vec{B}$ mitigates the momentum of the electrons. The magnetic field at the surface imparts little force on the relatively heavy and slow moving positive ions but has a significant impact on the relatively fast moving, light weight electrons. This results in a non-zero net change in the total momentum of the positive ions and electrons allowing thrust to be realized.

FIG. 3 depicts an electromagnetic flow accelerator 300 operable to be used to manipulate fluid flow over a surface. FIG. 3 adds a controller 212 operable to modulate the frequency and amplitude of the electric field $\vec{E}$ to manipulate the acceleration of the ionized fluid. Controller 212 may also modulate the amplitude of the magnetic field $\vec{B}$ where electro magnets or super conducting magnets are used.

Electrons may be collected using positive electrical terminals(s) 214, such as an anode. Positive terminal 214 and be coupled to a conductive element 216 and configured to transport the electrons to a location downstream of the electrodes. A negative terminal 218 such as a cathode can be coupled to the other end of conductive element 216 at a downstream location, where the electrons can be re-inserted into fluid flow 201 to help neutralize the charge of fluid flow 201. In addition, a Hall current will flow in a direction perpendicular to both the electric field and the magnetic field. To enhance this current, additional electrodes should be coupled such that this Hall current can flow unimpeded.

Controller 212 can be configured to receive information from one or more sensor(s) 222 regarding the characteristics of fluid flow 201 at some downstream location, and control operation of plasma generator 224 and electro-magnetic accelerator 226. Controller 212 can also control the operation of magnets 206 when they take the form of electromagnets or superconducting magnets. When a pulsed electric field to the electromagnetic accelerator 200, the strength and/or the pulse frequency of the electric field can be varied, depending on the force required from fluid flow.

Controller 212 is typically implemented with a processing system that can be embodied in any suitable computing device(s) using any suitable combination of firmware, software, and/or hardware, such as microprocessors, Field Programmable Sate Arrays (FPGAs), Application Specific Integrated Circuit (ASTCs), or other suitable devices. Controller 212 can be coupled to a power supply (not shown) to control power supplied to plasma generator 224 and electromagnetic accelerator 226. Sensor(s) 222 can also provide information regarding the velocity, pressure, temperature, and other characteristics of fluid flow 201 to controller 212 to operate electrodes 206 and plasma generator 224.

Any suitable component or combination of components can be used for controller 212, plasma generator 224, electromagnetic accelerator 226, positive terminal 214, negative terminal 218, conductor 216, and sensor(s) 222. For example, plasma generator 224 can be implemented by strong electric fields, electron beams, microwaves, and other phenomena and/or components capable of generating plasma. Electromagnetic accelerator can be implemented with one or more suitable device(s) capable of generating an electrical field transverse to a magnetic field.

Figure 4:
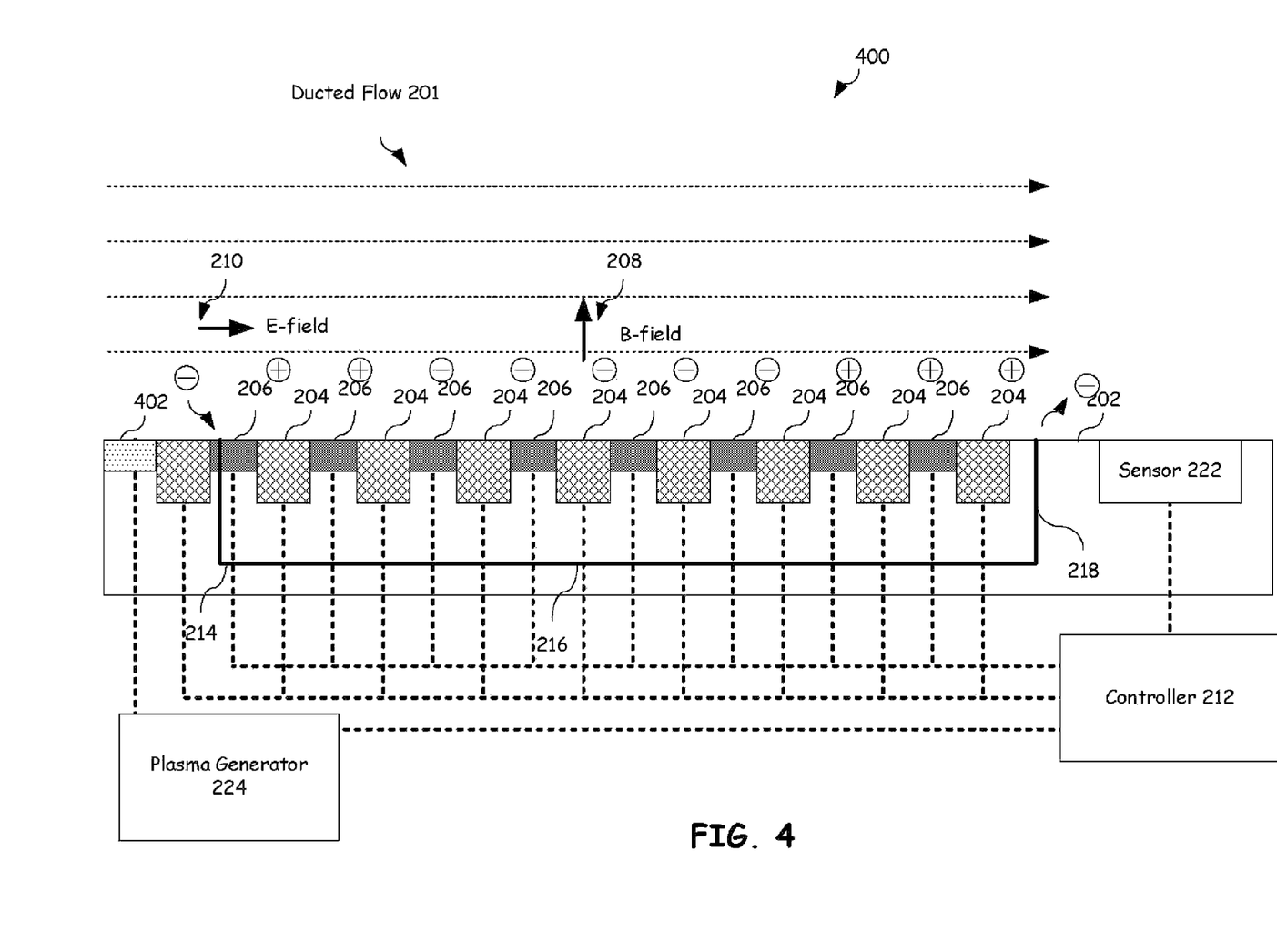
FIG. 4 depicts a third electromagnetic flow accelerator operable to be used to manipulate fluid flow over a surface in accordance with embodiments of the present invention

FIG. 4 depicts an embodiment of another fluid flow system 400 configured to manipulate a continuous fluid flow 201. Controller 212 is coupled to regulate electrodes 204 to generate an electric field that accelerates flow 201. Electrodes 204 may be pulsed at one or more desired frequencies, and/or operated to apply a continuous electric field. The functions of plasma generator 224 can be performed by electron beams being injected into the fluid flow above ducted surface 202 through electron beam windows 402 to ionize fluid flow 201. Windows 402 may be heated by electron beams 308, and are of sufficient mechanical strength for the environment in which ducted surface 202 is utilized. Any suitable type of window 402 can be utilized. For example, in some configurations, thin metallic foils with passive cooling can be utilized for windows 402. In other configurations with electron beams of relatively high current densities, either active cooling or plasma windows can be utilized. Windows 402 typically comprise only a portion of one or more walls of ducted surface 202. For example, FIG. 4, shows windows 402 as a rectangular strip; however any suitable number, shape, and configuration of windows 402 can be used. The amount of ions generated can also be varied, as required, by controlling generation of electron beams.

Ducted surface 202 can be configured with one or more magnet devices 206 that can be operated by controller 212 to create a transverse magnetic field normal to the direction of the electric field. Electrodes 204 and magnet devices 206 together perform at least some of the functions of an electromagnetic field generator. Magnetic devices 206 such as permanent magnets, electro-magnets, and/or superconducting magnets can be used to generate a magnetic field that is aligned approximately normal to the electric field E and flow 201. Other suitable devices for generating a magnetic field can be used, in addition to, or instead of, magnet devices 206. Additionally, although magnet devices 206 are shown distributed over the length of ducted surface 202, one or more magnet devices 206 can be positioned in any one or more suitable locations on ducted surface 202.

Ducted surface 202 may be a seamless aerodynamic or hydrodynamic surface over which fluid flow passes. Fluid flow can be any suitable liquid, gaseous, and/or solid substance(s) supplied from any suitable source (s). Electron beams can increase the ionization of flow, which can be supplied as a non-ionized, partially ionized, or fully ionized substance, as required.

Figure 5:
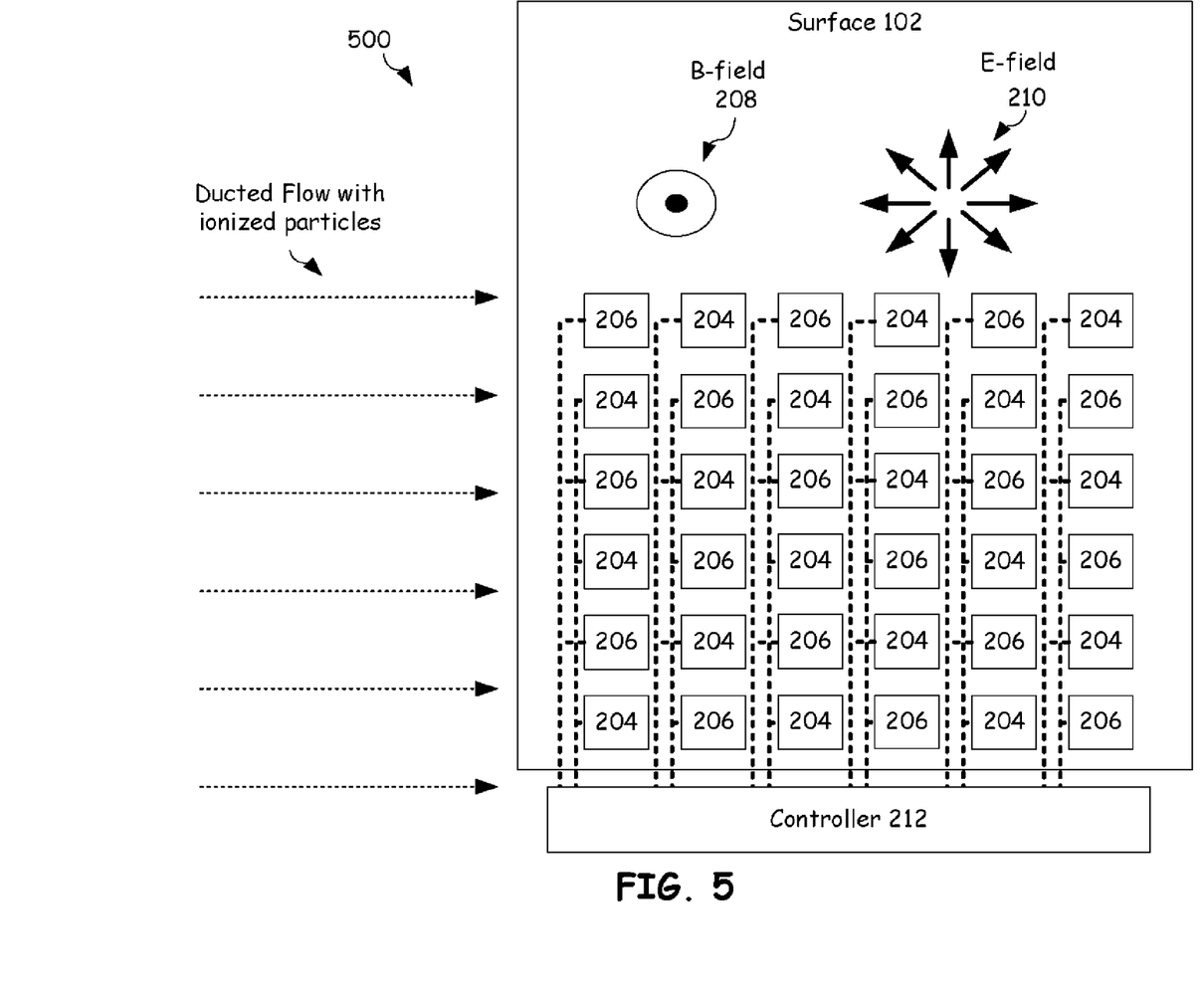
FIG. 5 depicts an plasma accelerator operable to be used to manipulate fluid flow in both a laterally and longitudinally direction over a surface in accordance with embodiments of the present invention

FIG. 5 depicts an embodiment of a fluid flow system 500 configured to manipulate a continuous fluid flow 201 both longitudinally and laterally. The embodiments discussed above primarily use the electrodes to accelerate ions in the direction of the flow field (i.e. longitudinally). Other embodiments may cause the ions to be deflected within the plane of the flow field (i.e. laterally). FIG. 5 depicts an array of electrodes 204 are embedded within aerodynamic ducted surface 202. Fluid flow 201 flows in a fore to aft (longitudinal) direction over ducted surface 202. Magnetic material 206 is embedded proximate to the array of electrodes 204. The magnetic field associated with the array is substantially normal to the local ducted surface 202. The electric field 210 is in a plane substantially normal to a magnetic field 208. However, by controlling the potential at various electrodes within electrode array 204 the electric field may be made to travel in any direction within that plane (i.e. longitudinal or lateral).

Referring to FIGS. 2-5, the electrodes can be arranged in electrode pairs with alternating polarity. Controller 212 can activate and deactivate each pair of electrodes in series over a period of time. For example, at time T1, a first pair of electrodes 204 is activated. At time T2, the first pair of electrodes 204 is deactivated and the second pair of electrodes 204 is activated. At time T3, the second pair of electrodes 204 is deactivated and the third pair of electrodes 204 is activated, and so on. When the last pair of electrodes 204 is deactivated, the first pair can be activated to begin the series over again, causing a wave of pulsing electric field E to "travel" across the surface. Such an arrangement of electrodes 204 can be used in various embodiments, including systems 200 (FIG. 2), 300 (FIG. 3), 400 (FIG. 4), and 500 (FIG. 5).

Note that various embodiments of fluid flow systems 200 (FIG. 2), 300 (FIG. 3), 400 (FIG. 4), and 500 (FIG. 5) do not require moving mechanical components to manipulate the ducted fluid flow above the surface. The electrodes can be pulsed at frequencies above those that can be achieved with mechanical components in other types of zero-net-mass jets. Additionally, the strength of the electric field E proximate to ducted surface 202, the magnetic field B proximate to ducted surface 202, and the ionization of flow, can be adjusted to achieve fluid flow with greater control than those generated by mechanical systems. Thus, a greater degree of control over the boundary layer profile within the ducted fluid flow may be realized. Fluid flow systems 200, 300, 400, and 500 can be configured with components that can withstand very high speeds and temperatures. Accordingly, fluid flow can be manipulated/generated to control flow at hypersonic temperatures and speeds, as well as lower temperatures and speeds.

The ability to manipulate and control fluid flows has tremendous potential for improving system performance in diverse technological applications, including: mixing and combustion processes, boundary layer flow of aerodynamic surfaces, pressure shock stabilization, engine inlet boundary layer diversion, inlet duct secondary flow control, and thrust management, among others.

Embodiments of the present invention can be used in a variety of industrial applications having ducted flows such as a smokestack, where it may be desirable to direct a plume of a smokestack to drive the smoke and exhaust in a certain direction. These embodiments can be used to pump additional mass flow in the ventilation or environmental control system of a structure or vehicle. Some embodiments can boost pumping capacity by 100% or more over a steady-state ejector, essentially doubling the pumped mass flow. Embodiments can also be used to cool electronic equipment, as well as other devices.

Figure 6:
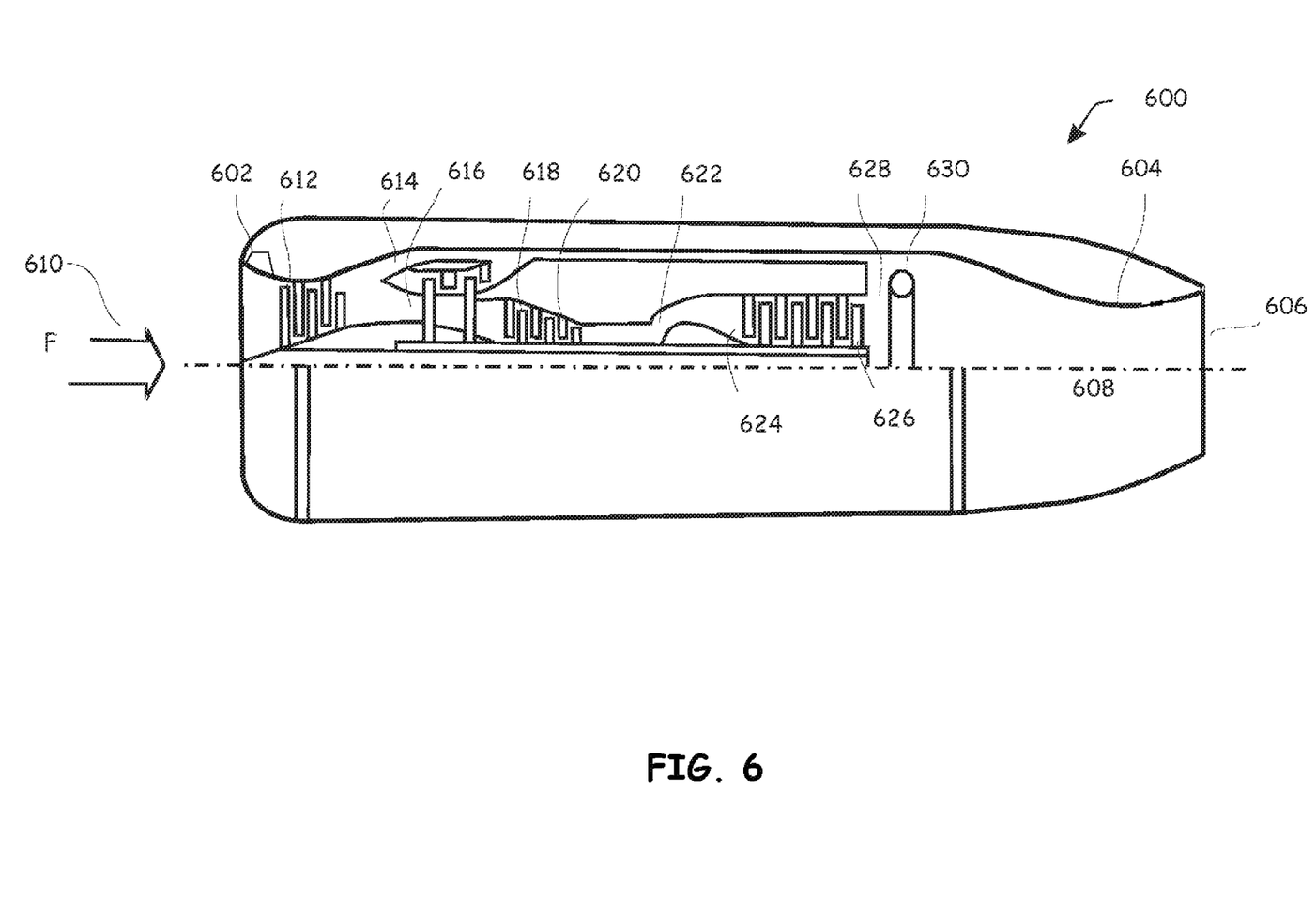
FIG. 6 shows an embodiment of engine configured with plasma accelerators to vector fluid flow at the throat and/or exit areas in accordance with embodiments of the present invention.

FIG. 6 shows an embodiment of engine 600 configured with plasma accelerators 602 to manipulate fluid flow at the inlet 605. Primary flow 610 enters jet engine 600 through fan section 612, comprised of a plurality of rotating fan blades. This flow is pushed into bypass section 614 and compressor section 616. Compressor section 616 is comprised of a plurality of compressor blades 618, 630 which compress flow 610 into combustion chamber 622. Fuel is mixed with flow 610 in combustion chamber 622 and ignited, thereby adding energy to flow 610, increasing the temperature of flow 610 in combustion chamber 622. Pressure within combustion chamber 622 forces flow 610 into turbine section 624, which is comprised of a plurality of turbine blades 626. Turbine section 624 removes some energy from flow 610 to power compressor section 618 and turbine section 624. Flow 610 then passes into exhaust chamber 618 where it combines with the flow from bypass section 614. An afterburner 630 can provide additional fuel, which can be ignited to increase the energy of flow 610. Flow 610 is then expelled from engine 600 through exit 606 as an exhaust flow.

Engine 600 creates thrust related to the velocity of the mass and density of the air of flow 610 over a given time period. Typically, in a jet engine, flow 610 is a subsonic flow of air until it reaches throat 604. Nozzle 608 cooperates with exit 606 to accept flow 610 from exhaust chamber 628 and to accelerate exhaust flow 610 to higher velocities, typically supersonic velocities. To achieve optimum acceleration of the exhaust flow, nozzle 608 converges the flow at throat 604, which is the point or section in nozzle 608 having the smallest cross sectional area, the constriction of throat 604 typically accelerating flow 610 to a sonic velocity, and a supersonic velocity after throat 604. Constriction of flow 610 at throat 604 operationally translates energy in flow 610 from pressure and temperature into velocity, thus creating thrust opposite to the vector of flow 610 as flow 610 exits nozzle 608. Although nozzle 608 is depicted as a fixed geometry nozzle, it should be understood that variable geometry nozzles could be incorporated in engine 600 to enhance control of the exhaust flow.

In engine 600 plasma accelerators 602 can be located at different positions to affect different performance parameters of engine 600. Additionally, the pulse frequency and amplitude of the electric field, magnetic field and ion generation/injection can be varied to optimize performance.

Figure 7:
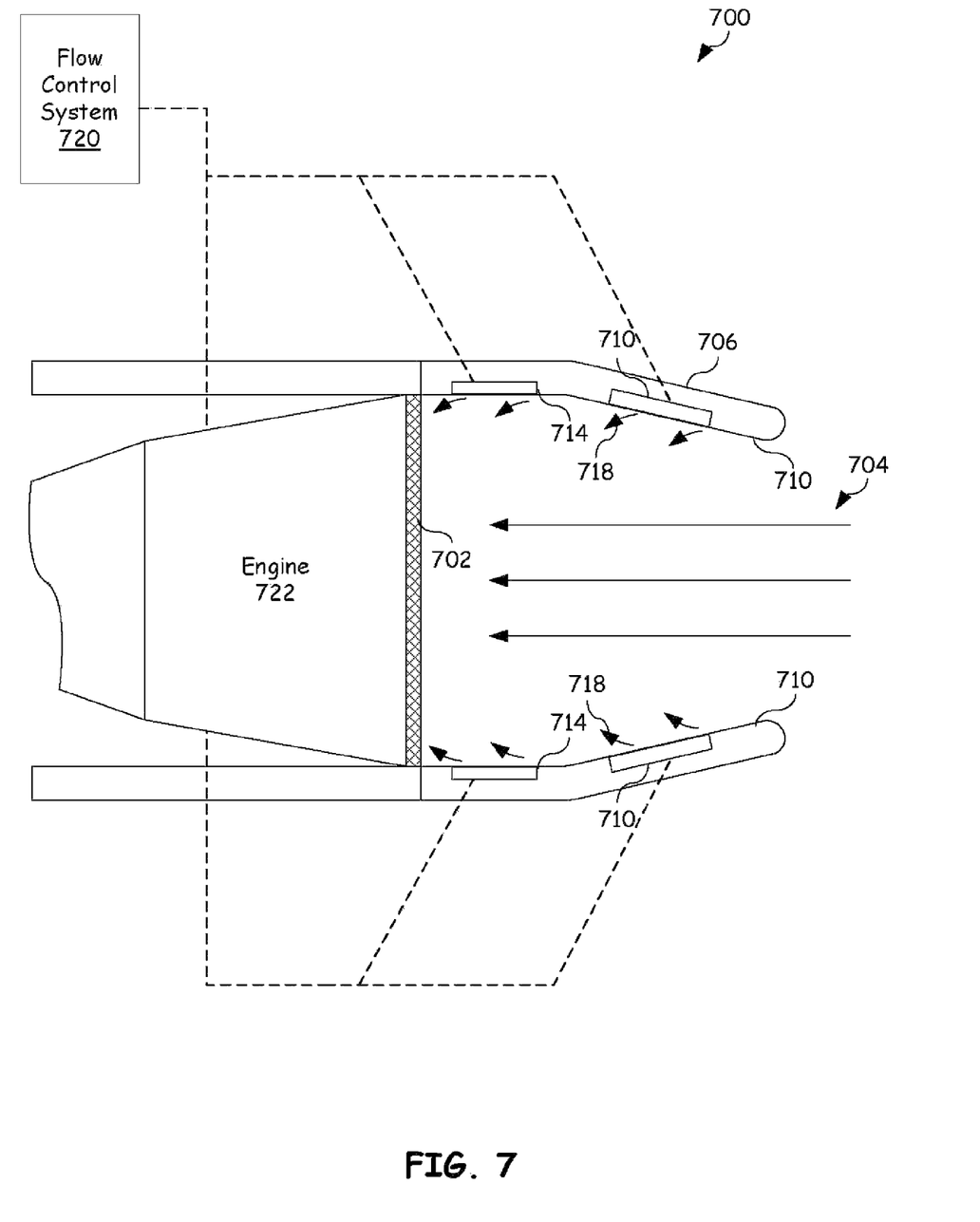
FIG. 7 depicts a flow inlet that employs a flow control system in accordance with an embodiment of the present invention.

FIG. 7 depicts an embodiment of the present invention of a flow inlet 700 operable to provide improved pressure recovery across compressor face 702 of a jet engine, such as engine 600. This embodiment receives a primary flow 704 within a ducted flow inlet 706. This flow inlet includes flow inlet 706, primary electromagnetic flow accelerator(s) 710 and optional secondary electromagnetic flow accelerators) 714. Electromagnetic flow accelerators 710 and 714 accelerate low energy air within the lower regions of the boundary layer of primary fluid flow 704 within flow inlet 706. Both primary electromagnetic flow accelerators) 710 and optional secondary electromagnetic flow accelerators) 714 accelerate fluid 718. Inlet flow control system 720 may adjust the acceleration and direction of ionized fluid accelerated by the electromagnetic flow accelerator 710 and optional secondary electromagnetic flow accelerator 714 by adjusting the electric fields, magnetic fields and ionization within the ducted fluid flow. Through these adjustments, it is possible to improve pressure recovery seen by compressor face 702 of engine 722 coupled to the flow inlet. The ratio of adjustments made by the primary electromagnetic flow accelerators and the optional secondary electromagnetic flow accelerators) allows favorable change in the circumferential distortion to be realized without significantly reducing pressure recovery or increasing spatial distortion.

Primary and optional secondary electromagnetic flow accelerators accelerate fluid and as such, provide an active flow control technique. The fluid accelerated by these electromagnetic flow accelerators may be redirected or eliminated when not required for inlet flow control. This is especially desirable when compared to prior solutions that employed passive strategies successful in one condition but would likely increase a blade's drag penalty at other conditions. Active inlet flow control provides the ability to adjust or shut off the accelerated fluid flow. In so doing, the use of electromagnetic flow accelerators may reduce or eliminate the risk of negative effects associated with passive solutions. Additionally, electromagnetic flow accelerators eliminate the need to bleed air from an engine compressor when not required to adjust the pressure recovery of the engine inlet.

Figure 8:
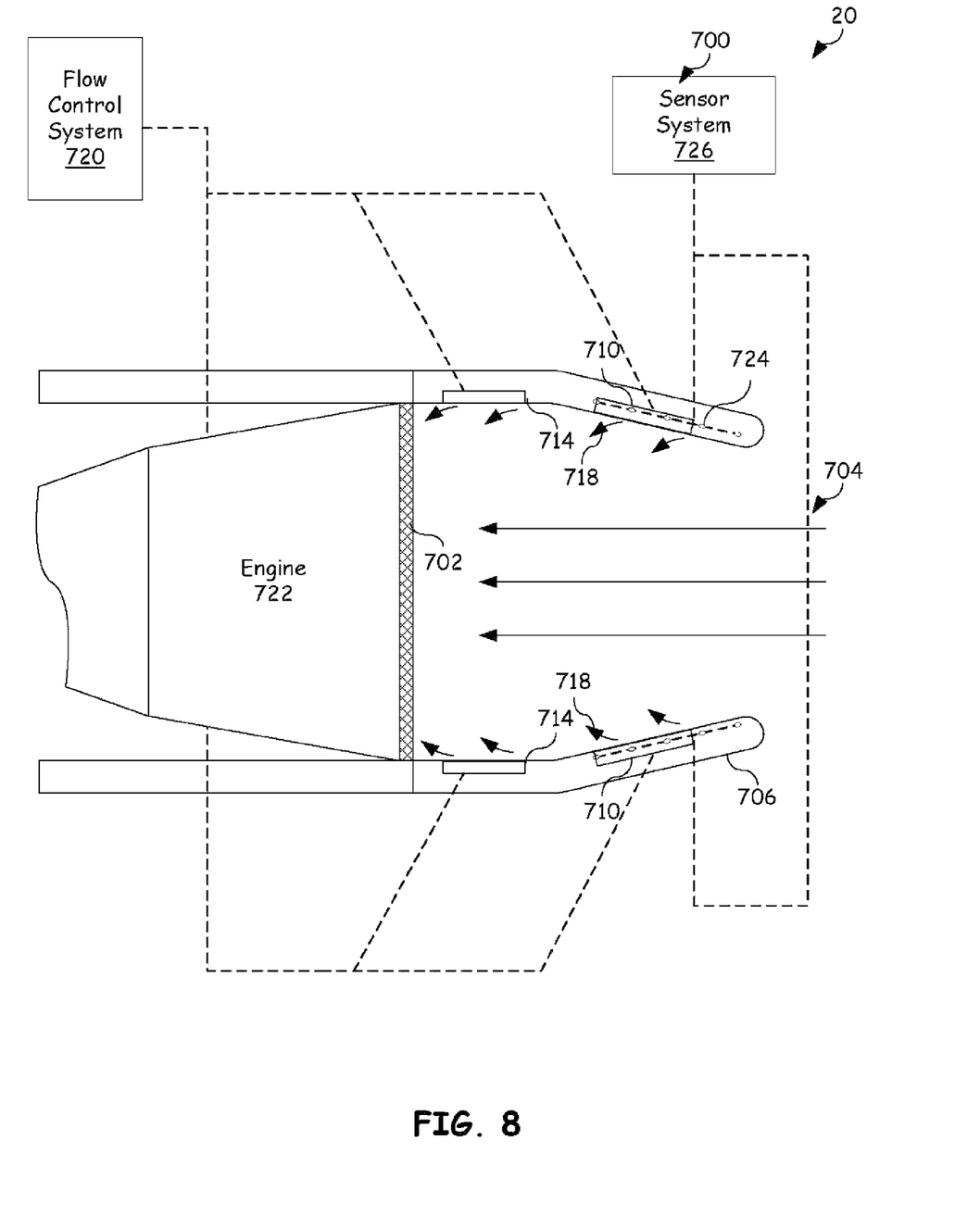
FIG. 8 depicts a flow inlet that employs a flow control system in accordance with a second embodiment of the present invention.

This inlet flow control system may contain sensors 724 as shown in FIG. 8, wherein the sensors are operable to sense engine conditions such as engine speed so that when the engine is operating at a predetermined frequency associated with the blade number, the inlet flow control system may redistribute accelerated fluid in order to improve pressure recovery when that engine condition exists. When a particular engine condition is not in existence it may not be necessary to redistribute flow accelerated by the primary and optional secondary electromagnetic flow accelerators. This redistribution of the accelerated fluid can mitigate blade vibration in jet engine 722 allowing the weight of the engine to be reduced as hardening of these blades is not required. In another embodiment the flow control system instead of sensing a specific engine condition may sense the actual pressure recovery or circumferential distortion across the engine inlet and then compare the sensed conditions with desired conditions and redistribute flow to improve pressure recovery when the sensed conditions compare unfavorably to the desired conditions.

Although discussed as single electromagnetic flow accelerators), array(s) of electromagnetic flow accelerators may be located within the inlet. Multiple electromagnetic flow accelerators can be individually addressable, and all, or only a select portion, of electromagnetic flow accelerators may be activated at one time. In this manner, the apparent aerodynamic shape of the inlet 706 may be specifically tailored for a given flow condition. If inlet 706 is configured with pressure, or other appropriate sensors, then a control computer can evaluate the forces on the compressor face and determine the appropriate actions by the electromagnetic flow accelerators.

A control system, such as flow control system 720 may be operably coupled to electromagnetic flow accelerators 710 and 714. This control system is operable to actively direct electromagnetic flow accelerators 710 and 714 to introduce secondary flows in order to achieve a desired primary fluid flow 704 within the flow inlet.

This active control may be further complemented by the sensor system 726 of FIG. 8 operably coupled to the electromagnetic flow accelerators. This sensor system 726 may employ sensors 724 located at various locations within the flow inlet. These sensors are operable to detect the characteristics of primary fluid flow 704 within the flow inlet. Sensor outputs are provided to sensor system 726 and flow control system 720. The flow control system is operable to compare the detected fluid flow characteristics with desired fluid flow characteristic. Then flow control system 720 may actively direct the electromagnetic flow accelerators to introduce secondary flows that results in a desired fluid flow within the flow inlet.

Flow control system 720 may include a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Figure 9A:
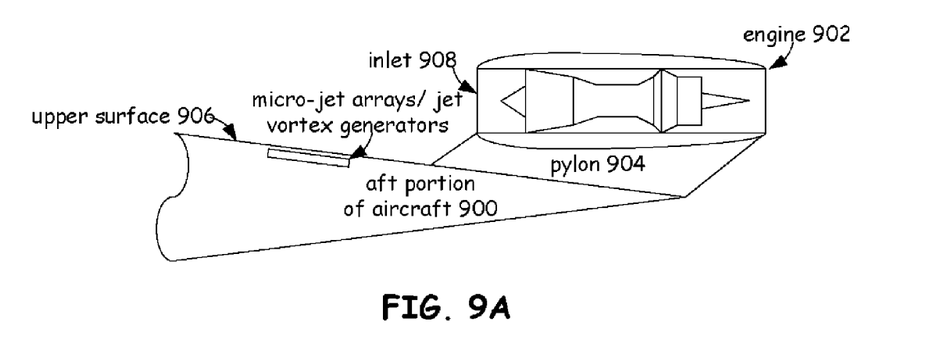
FIGS. 9A, 9B and 9C depict a cross section of an aircraft having arrays of electromagnetic flow accelerators operable to minimize the impact of boundary layers on engines located near or submerged within the surface of the airframe.
Figure 9B:
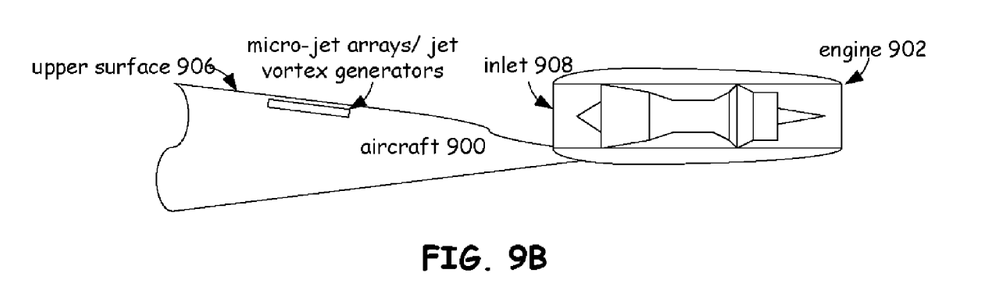
Figure 9C:
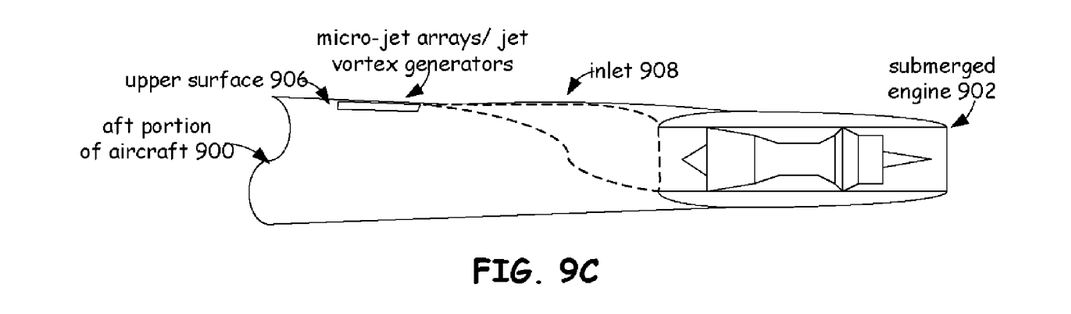

FIGS. 9, 9B, and 9C depict a cross-section of an aircraft where the engine inlets are placed near the upper surface or submerged within the upper surface of a vehicle such as an aircraft. Here aircraft 900 has the engine 902 located near the aft portion of the aircraft. FIG. 9A depicts engine 902 being mounted on a pylon 904 but located near the upper surface 906 of aircraft 900. Mounting above but near the upper surface avoids some problems associated with ingesting boundary layer flow (low energy boundary layer air) at or near upper surface 906. FIG. 9B depicts an instance where engine 902 is mounted at the surface to eliminate the pylon or nacelle supporting engine 902. By eliminating the pylon or nacelle 904, a smaller surface area is experienced, thus reducing weight and drag of the aircraft 900. FIG. 9C depicts the instance where an engine 902 is submerged within the upper surface 906 of aircraft 900. In the cases presented in FIGS. 9B and 9C, electromagnetic flow accelerators may be used to actively control and manipulate the boundary layer as seen by inlet 908 of engine 902. These electromagnetic flow accelerators may use continuous or pulsating air jets for boundary layer control. These electromagnetic flow accelerators manipulate the shedding, size, and trajectory of vorticles as well as the boundary layer to improve the pressure recovery of the flow inlet at engine 902. Previous solutions may have merely used static electromagnetic flow accelerators to manipulate the boundary layer and flow structures ingested by the engines. Although these engines may still experience airflow distortion, the electromagnetic flow accelerators located forward of the flow inlets to engine 902 can significantly reduce distortion of the airflow ingested by these engines. This may reduce the portion of the lower energy boundary layer ingested by an engine located near the surface or submerged within the surface of the airframe. By reducing the amount of low energy boundary layer air ingested by the engine, the drag reduction experienced by ingesting the low energy boundary layer fluid may be reduced. Thus, the present invention can significantly improve the performance of a vehicle such if engine inlet distortion can be controlled.

Figure 10A:
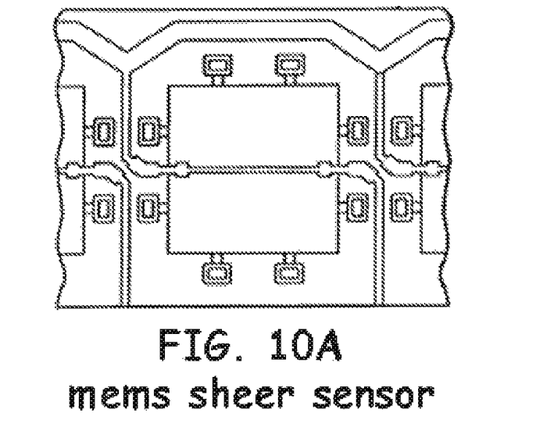
FIGS. 10A-10C depict various potential sensors.
Figure 10B:
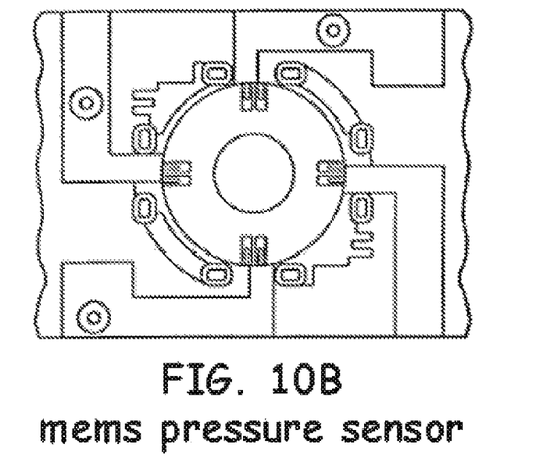
Figure 10C:
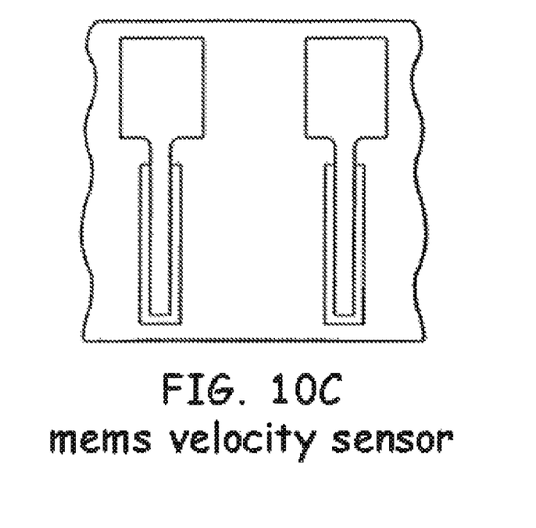

The sensor system of FIG. 8 may receive input from conventional flow sensors or micro fabricated electro-mechanical sensor devices such as those illustrated in FIGS. 10A, 10B and 10C. FIG. 10A depicts sensor 724 as a MEMS sheer sensor. This device functions in a manner similar to a hot-film sheer stress sensor. A small surface flush with the duct wall is maintained at a constant temperature. The heat flex at the duct wall is then measured. This heat flux can be calibrated to sheer stress.

FIG. 10B depicts sensor 724 as a MEMS pressure sensor. FIG. 10C depicts sensor 724 as a velocity sensor. This device functions in a manner similar to hot-wire anemometers. Electric current is passed through a metal element exposed to the fluid flow. The fluid flow convectively cools the element, effecting a change in its electric resistance. This change in resistance can be related to the velocity magnitude at the sensor through calibration. These sensors may be incorporated into surfaces proximate to the fluid flow within the flow inlet.

Figure 11:
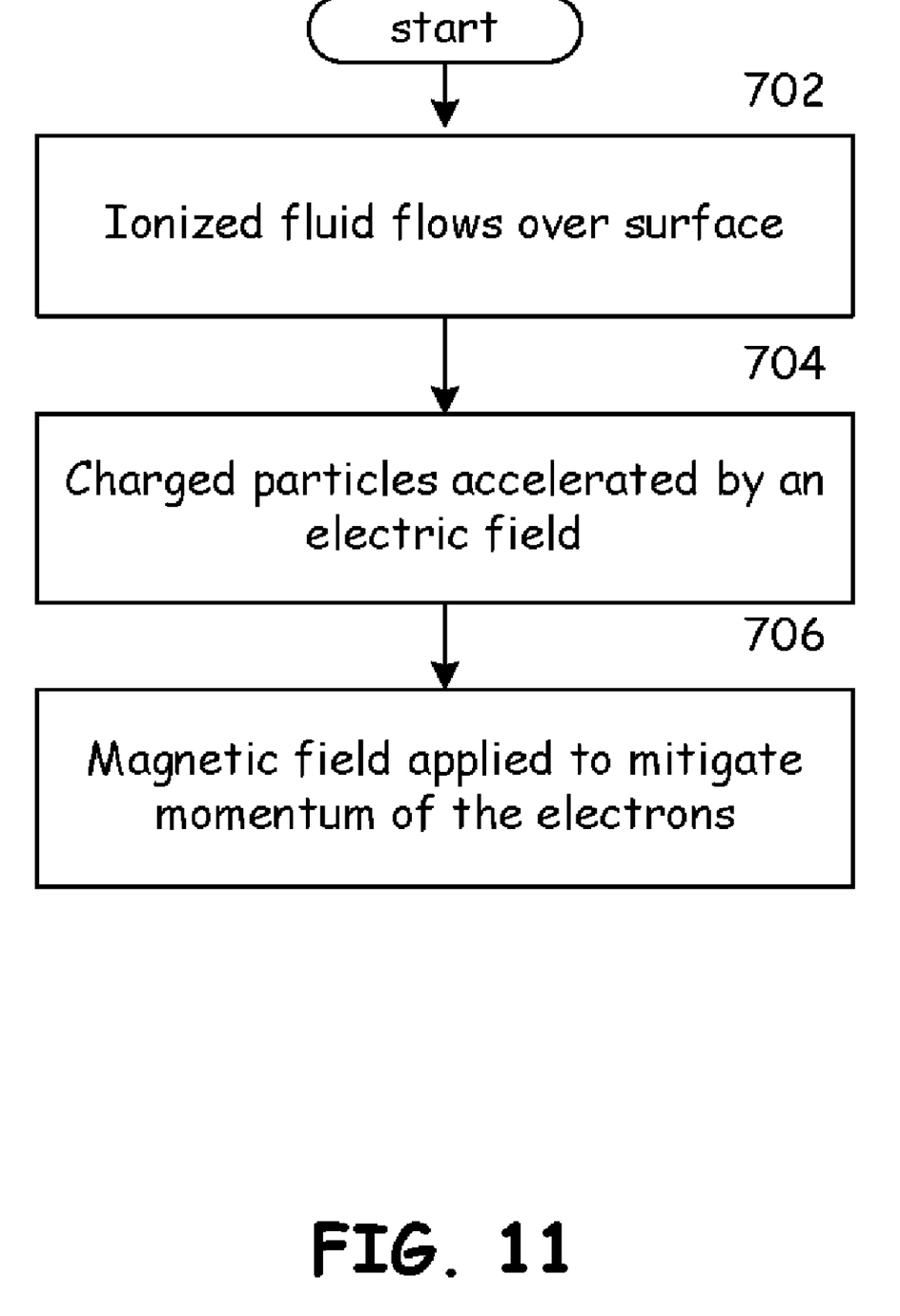
FIG. 11 is a logic flow diagram illustrating a method to manipulate a ducted fluid flow in accordance with embodiments of the present invention.

FIG. 11 provides a logic flow diagram illustrating a method to manipulate a dusted ducted fluid flow within a flow inlet having dusted ducted surfaces. This improved flow may result in the better attachment of the fluid flow to the ducted surface. Operations 700 begin with Step 702 where an ionized fluid flows into the flow inlet over the ducted surface. The degree of ionization of this fluid may vary from very weak ionization to very strong ionization. In Step 704 charged particles, i.e., ions, are accelerated in directions parallel i.e., in directions within the plane of the fluid flow over the surface. This may be done by using an array of embedded electrodes within the surface that generate the electric field. The magnitude, strength and relative motion of the electric field may be controlled by adjusting the potentials applied to individual electrodes. Other embodiments may vary this direction by manipulating the potential applied to the individual electrodes in order to accelerate the ions in a laterally direction as well. The accelerated positively charged ions accelerate low energy air within lower regions of a boundary layer over the ducted surfaces bounding the ducted fluid flow. In Step 706, a magnetic field is applied normal to the plane substantially containing the fluid flow. This magnetic field creates a large force on electrons. The force of the magnetic field mitigates the momentum of the electrons. Furthermore, these electrons may be collected with a positive electrical terminal such as a cathode and then injected into the fluid flow using an anode to help neutralize the charge of the fluid flow. This magnetic field may be the result of embedded magnets within the circuits. In embodiments where the fluid flow was a largely un-ionized fluid the fluid flow may be ionized upstream of the electrode array. By controlling the amplitude and direction of the electric field as well as the amplitude of the magnetic field. The ionized fluid flow may be manipulated over the surface.

Other embodiments may provide a method to reduce head loss associated with the ducting system allowing the amount of force used to be used more efficiently to supply fluid within the ducted system. Charged particles within the ionized fluid that flows over a surface are accelerated in directions within the plane of the fluid flow over the surface. This may be done by using an array of embedded electrodes within the surface that generate the electric field. The magnitude, strength and relative motion of the electric field may be controlled by adjusting the potentials applied to individual electrodes.

The present invention may be used to improve flow behavior in hydrodynamic applications as well. This may minimize head loss in a piping system, reduce flow noise within a piping system or over a submerged structure or to control and manipulate hydrodynamic flow about a watercraft for direction and thrust control.

Further embodiments of the present invention may include air-handling units such as HVAC systems, chemical processors, automobile air intake manifold or biomedical applications. However, the present invention should not be limited to these applications.

In summary, a method to manipulate a fluid flow over a fluid surface is provided. This method may be used to attach fluid flow to ducted surfaces bounding the fluid flow. This involves flowing a fluid over the surface wherein the fluid contains positively charged ions and electrons. An electric field accelerates ions and electrons in directions parallel to the electric field. The accelerated positively charged ions accelerate low energy air within lower regions of a boundary layer over the ducted surfaces bounding the ducted fluid flow. A magnetic field at the surface redirects ions and electrons based on their velocity and charge. The magnetic field imparts little force on the relatively heavy and slow moving positive ions but has a significant impact on the relatively fast moving, light weight electrons.

Embodiments of the present invention provide a significant advantage over prior techniques used to manipulate ducted fluid flow over a surface in that embodiments of the present invention provide the ability to have a seamless surface over which the ducted fluid flow is manipulated. When compared to traditional flow control methods or flow control methods using synthetic jet actuators, disturbances or discontinuities are required in the surfaces over which the ducted fluid flow is manipulated. Embodiment of the present invention may utilize plasma (charged particles) which may then be used to manipulate flow control over the surface with no moving parts, thus no discontinuities are required in the surface.

As one of average skill in the art will appreciate, the term "substantially" or "approximately", as may e used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed:

1. An aircraft, comprising:
    a jet engine having a compressor for compressing a primary air flow, a combustion chamber downstream of the compressor wherein a combustible fuel is injected into air compressed in the compressor, and a turbine downstream of the combustion chamber for driving the compressor, the compressor, combustion chamber and turbine being located along a longitudinal axis;
    a duct leading to the engine to receive the primary air flow as the aircraft is in flight, the duct directing the primary airflow parallel to the axis as the primary airflow reaches the compressor;
    a ducted surface upstream of the compressor over which the air flows, creating a boundary layer of slower moving air at the ducted surface;
    a plasma generator operable to generate a plasma in the primary air flow proximate to the ducted surface;
    a plurality of electrodes embedded within the ducted surface downstream from the plasma generator, wherein the electrodes are operable to generate an electric field in the boundary layer;
    a plurality of magnets embedded within the ducted surface adjacent and between the electrodes to generate a magnetic field in the boundary layer; and
    wherein the electric and magnetic fields are configured to accelerate the plasma, causing slower moving air within lower regions of the boundary layer to accelerate to reduce flow separation prior to reaching the compressor.

2. The aircraft of claim 1, further comprising:
    a controller electrically connected to the electrodes for sequentially energizing each of the electrodes to create a traveling wave.

3. The aircraft of claim 1, wherein the ducted surface is upstream of the duct.

4. The aircraft of claim 1, further comprising
    a first electrical terminal in communication with the primary air flow downstream from the plasma generator and upstream of the magnets and electrodes for acquiring electrons from the primary air flow,
    a second electrical terminal in communication with the primary air flow downstream of the first electrical terminal and upstream of the compressor for discharging electrons into the primary air flow prior to reaching the compressor; and
    a conductive element connected between the first and second electrical terminals, so that when electrons are collected by the first electrical terminal, the electrons can be re-inserted into the primary air flow from the second electrical terminal via the conductive element.

5. The aircraft of claim 1, wherein the ducted surface is located within the duct.

6. The aircraft of claim 1, further comprising:
at least one sensor for sensing a physical condition of the primary air flow as it flows over the ducted surface; and
a controller that receives information from the sensor and controls the electrodes in response thereto.

7. A method to improve a primary air flow within a flow inlet of a jet engine having a compressor for compressing the primary air flow, a combustion chamber downstream of the compressor wherein a combustible fuel is injected into air compressed by the compressor, and a turbine downstream of the combustion chamber for driving the compressor, the compressor, combustion chamber and turbine being located along a longitudinal axis, the method comprising:
providing a duct having an axially extending portion with a longitudinal axis, a flow inlet of the axially extending portion that is substantially perpendicular to the axis, and a ducted surface upstream of the compressor;
flowing the primary air flow-into the flow inlet in a direction parallel with the axis, the primary air flow creating a boundary layer of slower moving air at the ducted surface;
with a plasma generator, generating a plasma in the primary air flow proximate the ducted surface upstream of the compressor; and
creating an electromagnetic field proximate the ducted surface upstream of the compressor, and with the electromagnetic field, accelerating the plasma contained in the boundary layer of the primary air flow to accelerate the slower moving fluid within lower regions of the boundary layer.

8. The method of claim 7, further comprising:
sensing characteristics of the primary air flow as it flows over the ducted surface; and
controlling the electromagnetic field in response to the characteristics sensed.

9. The method of claim 7, further comprising:
providing an anode in communication with the air flow downstream from the plasma generator, a cathode in fluid communication with the air flow downstream of the anode and upstream of the compressor, and a conductive connection between the cathode and anode;
collecting electrons with the anode; and
reinserting the electrons into the air flow from the cathode via the connection.

10. The method of claim 7, further comprising sequentially energizing the electrodes to create a traveling wave.

11. The method of claim 7, wherein the ducted surface is within the duct.

12. The method of claim 7, wherein the ducted surface is upstream of the duct.

13. A method to improve airflow within a flow inlet of a jet engine having a compressor for compressing the primary air flow, a combustion chamber downstream of the compressor wherein a combustible fuel is injected into air compressed by the compressor, and a turbine downstream of the combustion chamber for driving the compressor, the compressor, combustion chamber and turbine being located along a longitudinal axis, the method comprising:
providing a duct having a flow inlet leading to the jet engine, a ducted surface upstream of the compressor, electrodes in the ducted surface, and magnets in the ducted surface adjacent and between the electrodes, the electrodes and the magnets being upstream of the compressor;
flowing the primary air flow into the flow inlet in a direction parallel with an axis of the jet engine and over the ducted surface, creating a boundary layer of slower moving air over the ducted surface;
with a plasma generator, creating a plasma in the primary air flow upstream of the electrodes and the magnets;
forming an electromagnetic field adjacent the ducted surface by energizing the electrodes;
with the electromagnetic field, accelerating the plasma, which accelerates the slower moving air in the boundary layer to reduce flow separation upstream of the compressor; and
sensing characteristics of the primary airflow over the ducted surface and controlling the plasma generator and the electrodes in response to the characteristics sensed.

* * * * *